United States Patent
Wang et al.

(10) Patent No.: US 12,225,011 B2
(45) Date of Patent: Feb. 11, 2025

(54) DATA PROTECTION IN NETWORK ENVIRONMENTS

(71) Applicant: INTERNATIONAL BUSINESS MACHINES CORPORATION, Armonk, NY (US)

(72) Inventors: Jin Wang, Xi'an (CN); Lei Gao, Xi'an (CN); A Peng Zhang, Xi'an (CN); Dan Sun, Beijing (CN); Jing Zhang, Shanghai (CN); Na Liu, Xi'an (CN); Xun Pan, Xi'an (CN); Zi Yun Kang, Handan (CN)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 17/809,563

(22) Filed: Jun. 29, 2022

(65) Prior Publication Data
US 2024/0007469 A1    Jan. 4, 2024

(51) Int. Cl.
*H04L 9/40* (2022.01)
*G06N 20/00* (2019.01)

(52) U.S. Cl.
CPC ............. *H04L 63/10* (2013.01); *G06N 20/00* (2019.01); *H04L 63/20* (2013.01)

(58) Field of Classification Search
CPC ......... H04L 63/10; H04L 63/20; G06N 20/00; G06N 5/01; G06N 20/20
See application file for complete search history.

(56) References Cited

U.S. PATENT DOCUMENTS

| | | | |
|---|---|---|---|
| 2010/0229241 A1 | 9/2010 | Liu | |
| 2013/0060601 A1 | 3/2013 | Kodialam | |
| 2014/0115715 A1 | 4/2014 | Pasdar | |
| 2015/0135329 A1 | 5/2015 | Aghasaryan | |
| 2016/0021079 A1 | 1/2016 | Schimmelpfeng | |
| 2021/0256159 A1 | 8/2021 | Ninglekhu | |
| 2021/0304285 A1* | 9/2021 | Alahmady | G06Q 30/0201 |
| 2022/0239758 A1* | 7/2022 | Klein | G06N 20/00 |
| 2022/0318644 A1* | 10/2022 | Huang | G06N 5/022 |
| 2023/0283628 A1* | 9/2023 | Johnston | H04L 41/16 726/22 |
| 2023/0367821 A1* | 11/2023 | Hicklin | G06F 16/90344 |

OTHER PUBLICATIONS

Bernabe, et al., "Holistic Privacy-Preserving Identity Management System for the Internet of Things", Hindawi, Mobile Information Systems, vol. 2017, Article ID 6384186, Aug. 8, 2017, 20 pgs., <https://doi.org/10.1155/2017/6384186>.

(Continued)

*Primary Examiner* — Huan V Doan
(74) *Attorney, Agent, or Firm* — Stosch Sabo

(57) ABSTRACT

Computer technology for protecting data security in a computerized system for recommending content to users where, a processing unit generates an identifier for a first data record relating to a user device based on a first machine learning model. Then, the processing unit sends the identifier to a service provider, and the service provider uses the identifier to determine one or more contents to be sent to the user device. Creating and using a decision tree machine learning (ML) model and a cluster ML model with training records and a transformed records.

20 Claims, 5 Drawing Sheets

(56) References Cited

OTHER PUBLICATIONS

Canbay, et al., "The Effect of Clustering on Data Privacy", Conference: 2015 IEEE 14th International Conference on Machine Learning and Applications (ICMLA), ResearchGate, Dec. 2015, 7 pgs., DOI:10.1109/ICMLA.2015.198.
Mell et al., "The NIST Definition of Cloud Computing", National Institute of Standards and Technology, Special Publication 800-145, Sep. 2011, 7 pages.
Srinivas, et al., "Hierarchical Model for Preserving Privacy in Horizontally Partitioned Databases", International Journal of Emerging Trends & Technology in Computer Science (IJETTCS), vol. 2, Issue 1, Jan.-Feb. 2013, 4 pgs.

* cited by examiner

US 12,225,011 B2

DATA PROTECTION IN NETWORK ENVIRONMENTS

BACKGROUND

The present invention relates to computer technology for data protection in network environments.

Nowadays, many different types of services are provided in different types of network environments. Service providers typically collect data from users when the users register to receive recommended contents from the service providers. However, the data collected for content recommendation may include user data that must be protected. Protection of the user data to avoid data leakage and security breaches during content recommendation is an issue.

The Wikipedia entry for "machine learning" (as of 22 Jun. 2022) states, in part, as follows: "Machine learning (ML) is a field of inquiry devoted to understanding and building methods that 'learn', that is, methods that leverage data to improve performance on some set of tasks. It is seen as a part of artificial intelligence. Machine learning algorithms build a model based on sample data, known as training data, in order to make predictions or decisions without being explicitly programmed to do so. Machine learning algorithms are used in a wide variety of applications . . . where it is difficult or unfeasible to develop conventional algorithms to perform the needed tasks. . . . Performing machine learning involves creating a model, which is trained on some training data and then can process additional data to make predictions. Various types of models have been used and researched for machine learning systems. . . . Typically, machine learning models require a high quantity of reliable data in order for the models to perform accurate predictions. When training a machine learning model, machine learning engineers need to target and collect a large and representative sample of data. Data from the training set can be as varied as a corpus of text, a collection of images, sensor data, and data collected from individual users of a service. Overfitting is something to watch out for when training a machine learning model."

SUMMARY

According to one embodiment of the present invention, there is provided a computer-implemented method. According to the computer-implemented method, a processing unit may generate an identifier for a first data record relating to a user device based on a first machine learning model. Then, the processing unit may send the identifier to a service provider, and the service provider may use the identifier to determine one or more contents to be sent to the user device.

According to another embodiment of the present invention, there is provided a computer system. The computer system comprises one or more processors, a computer-readable memory coupled to the one or more processors. The computer-readable memory comprises instructions that when executed by the one or more processors perform actions of the above-mentioned computer-implemented method.

According to another embodiment of the present invention, there is provided a computer program product. The computer program product comprises a computer readable storage medium having program instructions embodied therewith, the program instructions executable by a processor to cause the processor to perform actions of the above-mentioned computer-implemented method.

According to embodiments of the present invention, as the first data record may not be sent to the service provider directly, the first data record may be protected from data leakage. Contents recommended to the user device may be selected correlatively with the user device based on the generated identifier.

According to an aspect of the present invention, there is a method that performs the following operations (not necessarily in the following order): (i) receiving a training records data set including a plurality of training records; (ii) applying a set of classification and regression algorithm(s) to the plurality of training records to obtain a decision tree machine learning (ML) model including a plurality of leaf nodes, with the plurality of leaf nodes respectively corresponding to the plurality of training records, and with each given leaf node of the plurality of leaf nodes including an assigned value that is assigned to the training record corresponding to the given leaf node; and (iii) applying a set of clustering algorithm(s) to the plurality of training records to obtain a cluster ML model including a plurality of clusters including a predetermined number of clusters with each cluster defining a center point; and transforming new data record to obtain a transformed record.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
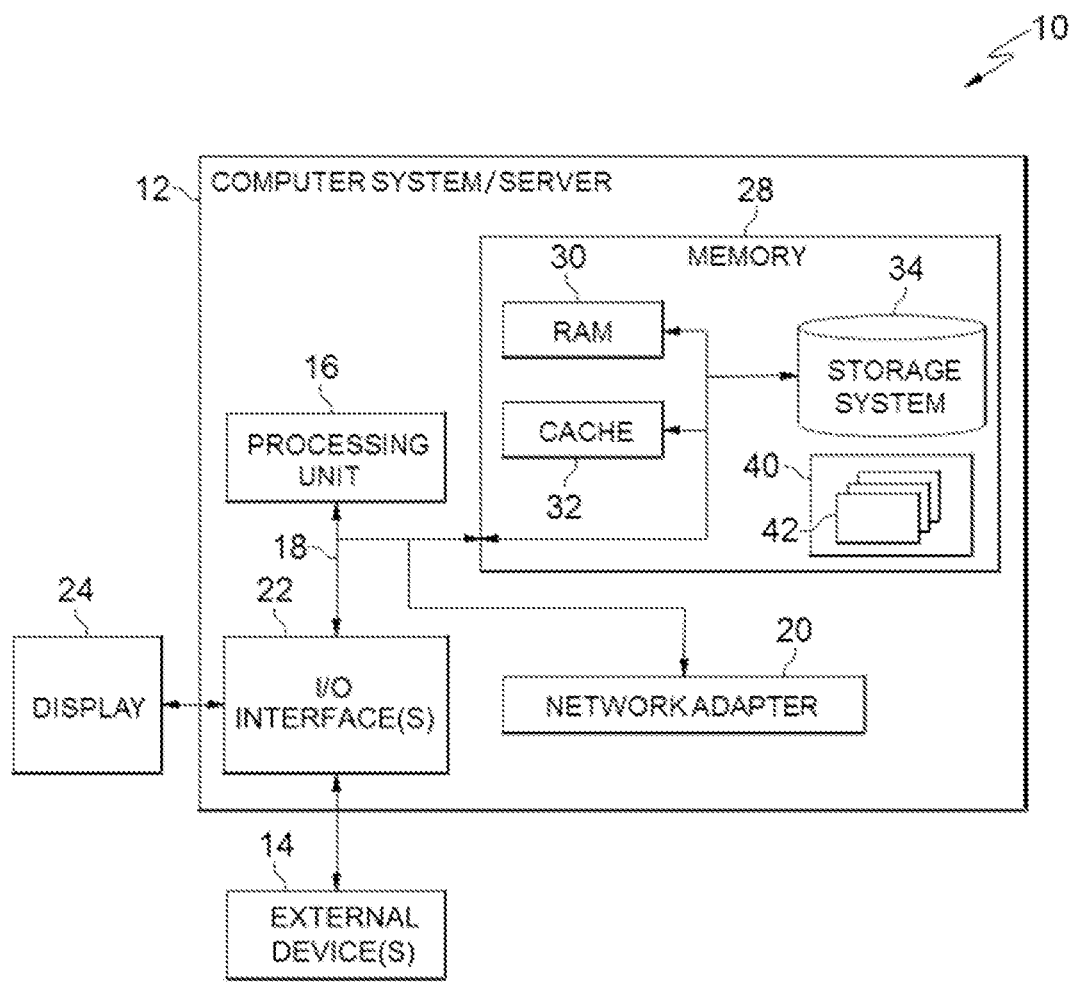
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (for example, mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (for example, a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (for example, at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (for example, network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (for example, the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
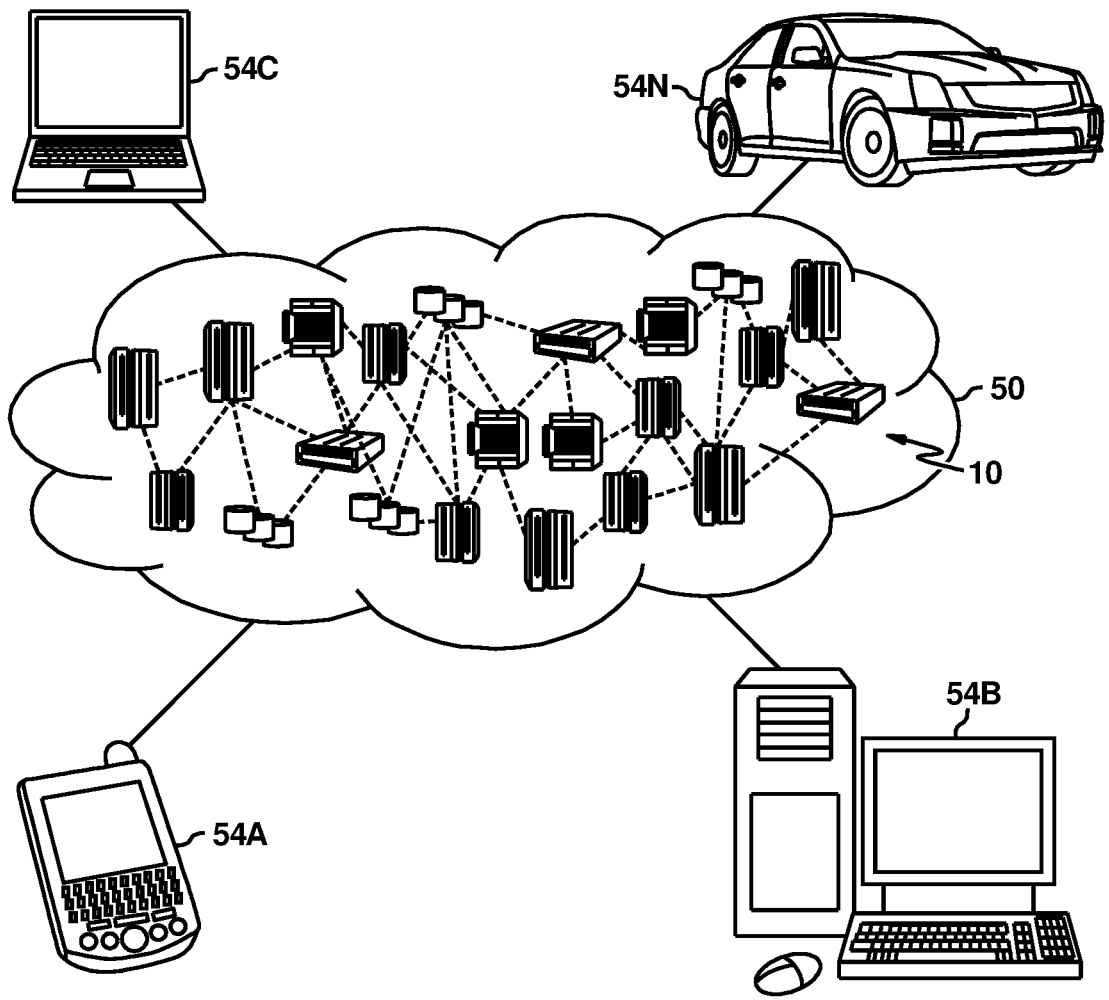
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (for example, using a web browser).

Figure 3:
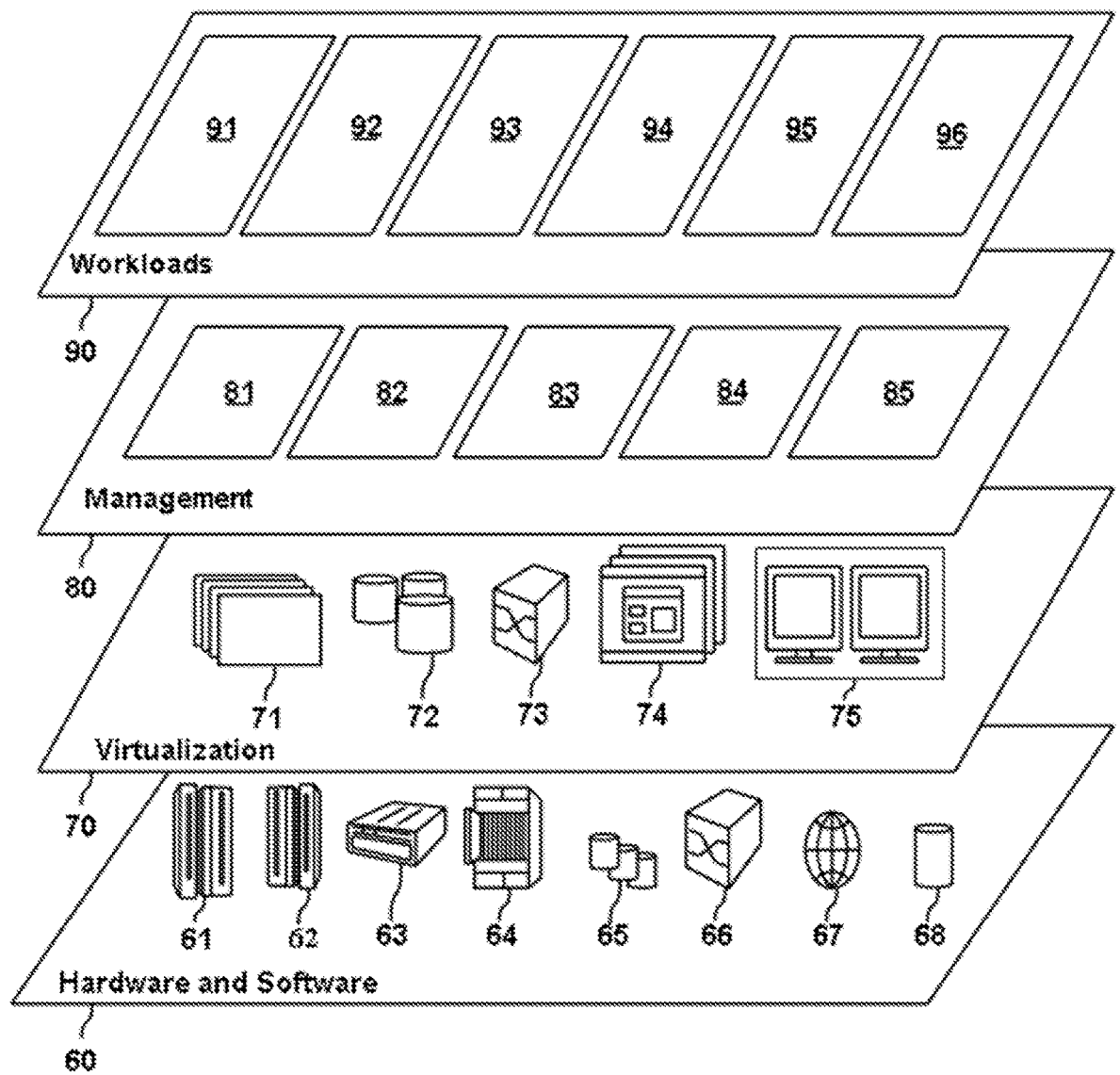
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data protection 96.

Figure 4:
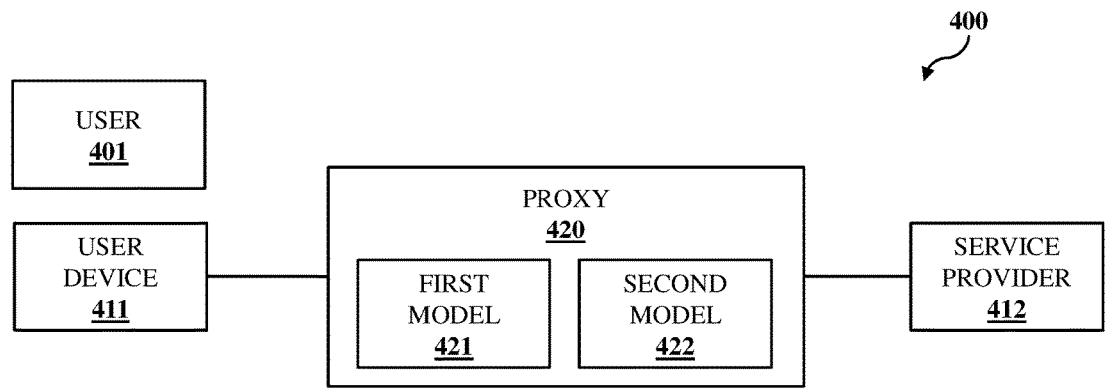
FIG. 4 depicts a schematic diagram of an example network environment according to embodiments of the present invention.

Referencing now to FIG. 4, an example network environment 400 is depicted. In the network environment 400, a user 401 uses a user device 411 to access a service (such as, a multimedia content service, or a social network service, etc.) provided by a service provider 412. As an example, user device 411 may take the form of computer system/ server 12 of FIG. 1, the computing devices 54A-N of FIG. 2, or any other type of device operated in network environments. The service provider 412 may be any type of server or have a structure similar to the computer system/server 12 of FIG. 1. The user device 411 and the service provider 412 may communicate with each other through one or more communication connections.

Taking the multiple media content service as an example, user 401 registers for a service, through the user device 411, with service provider 412 to authorize individualized content recommendation by service provider 412. To recommend individualized contents to user 401, service provider 412 typically collects data from user device 411 under authorization by user 401, such as, interests of user 401, etc. The user data of user 401 needs to be protected. Sending the collected data directly to the service provider 402 may increase the risk of data leakage and security breaches. Various embodiments of the present disclosure may include collection of the user data, transfer of the user data, storage of the user data, content recommendation, and other processing of the user data, etc. These data processing operations should be under authorization of users and follow appliable laws and regulations.

The present disclosure provides methods, systems, and computer program products to protect user data in a network environment.

Referring to the embodiment of FIG. 4, a proxy 420 operates between user device 411 and service provider 412. Proxy 420 communicates with user device 411 and service provider 412 through communication connections. In some embodiments, proxy 420 may be a physical device having a structure similar to the computer system/server 12 of FIG. 1, which may be operated by an authority entity independent from the service provider 412. In some other embodiments, proxy 420 runs on a device as a program module, such as, on user device 411, or another device communicable with user device 411 and service provider 412. Proxy 420 includes first model 421 and second model 422. In some embodiments, first model 421 and second model 422 are machine learning models, which will be described hereinafter. In some embodiments, some components or functions of proxy 420 may be distributed among and between multiple computers connected in data communication.

Figure 5:
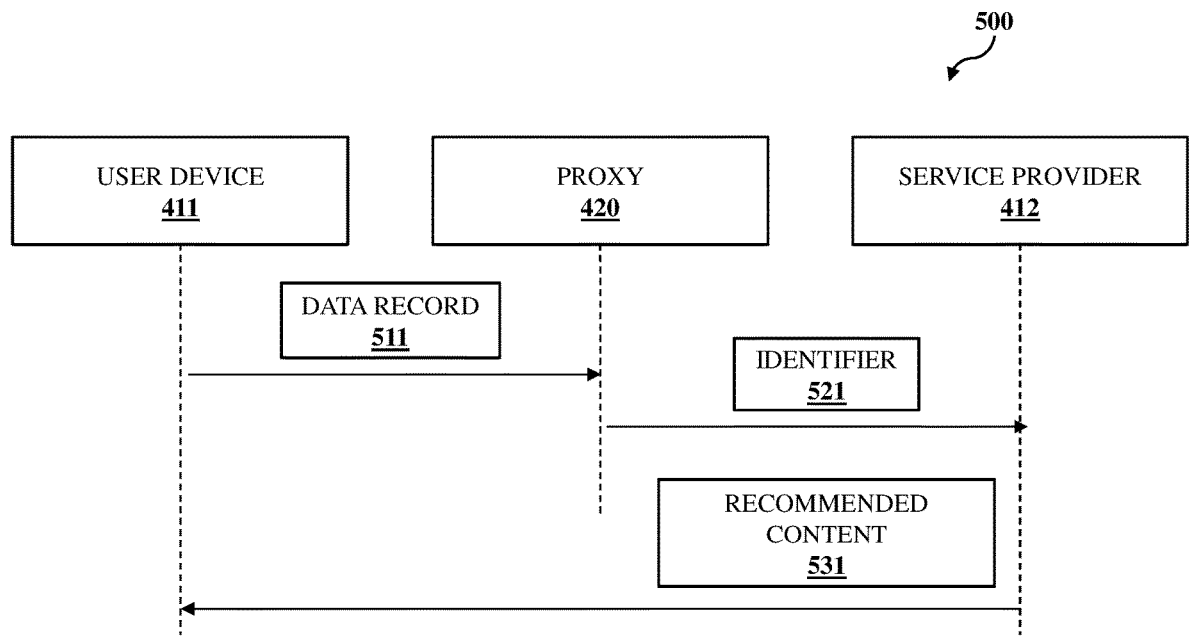
FIG. 5 depicts an example schematic diagram of interactions in the network environment according to embodiments of the present invention.

Referring now to FIG. 5, an example schematic diagram of interactions 500 in network environment 400 according to an embodiment of the present disclosure is depicted.

According to embodiments of the present disclosure, to access the content recommendation service provided by service provider 412, user 401 authorizes the user device 411 to send data record 511 to proxy 420. The data record may include user data of user 401 which is used for content recommendation purposes. The user data may be inputted by user 401 on user device 411 or collected on user device 411. In some embodiments, the user data of user 401 includes information to be protected. In some embodiments, data record 511 may be referred to as an original data record received from user device 411.

Table 1 describes an example data record collected on user device 411 for the content recommendation service. The example data record includes two data fields "Information 1" and "Information 2", and each of the data fields has a value. The data field "Information 1" may be a number field (such as, the viewing time length of a history recommended content, etc.), and the field "Information 2" may be a category field (such as, interested categories of contents of user 401, etc.). For example, if user 401 is interested in contents of categories A, B, and C, the data field "Information 2" of the example data record may have a value as "A, B, C". As a further example, the category field "Information 2" may be converted to a vector in a vector space corresponding to the number of categories. The data field "Information 2" of the example data record may be converted to a vector (1, 1, 1, 0, 0), which mean the total amount of categories may be 5 (A, B, C, D and E) and user 401 is interested in contents of the first three categories (A, B and C).

TABLE 1

| Example Data Record | |
|---|---|
| Information 1 | Information 2 |
| 170 | A, B, C |

After receiving data record 511, proxy 420 applies the data record 511 directly as an input to first model 421. The output of first model 421 is a value corresponding to data record 511.

In some embodiment, first model 421 may be a machine learning model created by proxy 420 using one or more machine learning algorithms. In some other embodiments, another device accessible by proxy 420 creates first model 421 and sends first model 421 to proxy 420. First model 421 is applied to data record 511 to obtain the value outputted by first model 421 following a decision process of first model 421. As an example, the first model 421 may be a classification and regression model created using one or more classification and regression algorithms now known or to be developed in the art. The one or more classification and regression algorithms may include classification and regression tree algorithms. It shall be understood that many other types of machine learning algorithms, now known (for example, CART, Quest, C5, CHAID, Random Forest) or to be developed in the future, may also be applied to create first model 421.

To create first model 421, proxy 420 or another device accessible by proxy 420 obtains training records and assign values respectively to each entry of the training records. As an example, the assigned values may be one or more digits or characters. The values may be assigned randomly or following one or more pre-set rules. In some embodiments, the number of different assigned values may be smaller than the number of different training records, which means some of the training records may correspond to a same assigned value. Proxy 420 or another device accessible by proxy 420 then creates the first model 421 based on the training records using one or more classification and regression tree algorithms. Each of the training records is mapped to a leaf node of first model 421 and each leaf node of first model 421 has the assigned value of the corresponding training record. After creation, first model 421 may be capable to map an input to a leaf node of first model 421 and output a value of the leaf node.

In some embodiments, the training records may include data records collected previously from one or more user devices and/or records generated based on the collected data records. It shall be noted that collection and processing of the data records herein shall be under authorization of relevant users and follow appliable laws and regulations.

As an example, if the number of the data records collected previously is not sufficient for the model training, simulated records may be generated based on the collected data records. For example, for a number field in an original entry of the collected data records, a simulated record may have a simulated value in the number field surrounding the original value of the number field of the original entry. The difference between the simulated value and the original value may be in a preset scope. For a category field in an original entry of the collected data records, the difference between a simulated value in the category field and the original value of the category field of the original entry may be in a preset distance in a vector space for the category field.

As an example, Table 2 describes example training records collected or generated by proxy 420 or another device accessible by proxy 420 for creating first model 421. The training records have data fields the same with that of the data record 511, and have values assigned to each entry of the training records. In this example, the field "Information 1" is a number field, and the field "Information 2" is a category field. For example, if a user maps with category information A, B, and C, a training record corresponding to the user may has the field "Information 2" as "A, B, C". As a further example, a value of the category field "Information 2" may be converted to a vector in a vector space corresponding to the amount of the categories, and the vector may then be used in the model training. For example, the value "A, B, C" may be converted to a vector (1, 1, 1, 0, 0), and the value "A, B, E" may be converted to a vector (1, 1, 0, 0, 1).

TABLE 2

Example Training Records

| Index | Information 1 | Information 2 | Value |
|---|---|---|---|
| 1 | 171 | A, B, C | 1100 |
| 2 | 180 | A, B, E | 100 |
| ... | ... | ... | |

In some embodiments, proxy 420 transforms data record 511 to obtain a transformed record, and then applies the transformed record as an input to first model 421. The output of first model 421 may be a value corresponding to the transformed record. In this embodiment, to obtain the transformed record, proxy 420 clusters the data record 511 to a first cluster based on second model 422 and obtain a record of a center point of the first cluster as the transformed record.

In some embodiments, second model 422 is a machine learning model created by proxy 420 using one or more machine learning algorithms now known or to be developed in the art. In some other embodiments, another device accessible by proxy 420 may create second model 422 and send the second model 422 to proxy 420. As an example, the one or more machine learning algorithms may include clustering algorithms for clustering objects, such as k-means algorithms, etc. It shall be understood that many other types of machine learning algorithms now known or to be developed may be applied to create the second model 422. It is noted that there are two (2) models here because there are two techniques used to protect sensitive records and each technique utilizes a different method. The first model always uses a one-to-multiple relationship to confuse the actual rule, and the first model typically takes the form of a decision tree model. The first model is sometimes herein referred to as a "tree model." The second model uses similar and common records to replace the actual record as is sometimes herein referred to as a "cluster model."

In some embodiments, to create second model 422, proxy 420 or another device accessible by proxy 420 obtains training records, which may be the same with the training records used for creating the first model 421. Proxy 420 or another device accessible by proxy 420 sets the number of clusters to be applied to the training records and create second model 422 based on the training records using one or more clustering algorithms. Each of the training records may be mapped to one of the clusters of first model 421 and each cluster may have a center point. After the creation, second model 422 may be capable to add an input to a cluster. Then, second model 422 may be capable to determine a record of a center point of the cluster.

According to this embodiment of the present disclosure, proxy 420 generates identifier 521 based on the value outputted by first model 421. In some embodiments, the outputted value may be applied as identifier 521 directly. In some other embodiments, other data or information may also be appended to the value of the first leaf node to generate identifier 521. For example, a timestamp of the time when identifier 521 is generated may be appended to the value to obtain identifier 521.

Referring to FIG. 5, after generating identifier 521, proxy 420 sends identifier 521 to service provider 412, and service provider 412 uses identifier 521 to determine one or more contents to be sent to user device 411. In some embodiments, the one or more contents to be sent to the user device may be referred to as recommended contents for user device 411. The one or more contents to be sent to the user device may comprise of various types of content such as texts, documents, videos, images, multiple media contents, and other type of contents.

In some embodiments, service provider 412 maintains a mapping relationship between identifiers and recommend contents, and service provider 412 determines the recommend contents based on the identifier using the mapping relationship. As an example, Table 3 describes example mapping between identifiers and recommend contents. Each entry of the Table 3 indicates an identifier and its corresponding recommended contents.

TABLE 3

Example Mapping Relationship

| Identifier | Recommended Content |
|---|---|
| 1100 | Content A |
| 100 | Content B |
| 1111 | Content C |
| ... | ... |

Referring to FIG. 5, service provider 412 determines the recommended content 531 for identifier 521, and then sends recommended content 531 to user device 411. As an example, if identifier 521 received by service provider 412 is "1100", service provider 412 responsively selects "Content A" as the recommended content 531 and sends "Content A" to user device 411.

In some embodiments, first model 421 and/or second model 422 may be updated using subsequent records after collection of the training records. The subsequent records may include data records subsequently collected from one or more user devices and/or data records generated based on the subsequently collected data records using the above-mentioned techniques. For example, proxy 420 may store data records received from user device 411 and one or more other user devices in a preset period and use them as new training records to retrain first model 421 and/or second model 422 to obtain a first updated model and/or a second updated model. Proxy 420 may deploy the first updated model and the second updated model to respectively replace functions of first model 421 and second model 422.

In some embodiments, structures of first model 421 may be updated, and clusters of second model 422 may be updated. In some other embodiments, new machine learning models may be created based on the new training records and first model 421 and second model 422 are updated with the new models as addon models. As an example, a voter may be applied for the first updated model to determine the output of the first updated model based on the outputs of first model 421 and the corresponding new model. As another example, records of center points of second model 422 and corresponding new model may be weighted to obtain a weighted record as the output of the second updated model.

According to this embodiment of the present disclosure, because data record 511 may not be sent to service provider 412, data record 511 may be protected from data leakage. Service provider 412 may still be able to select the recommended content 531 correlatively with user device 411 based on identifier 521.

Figure 6:
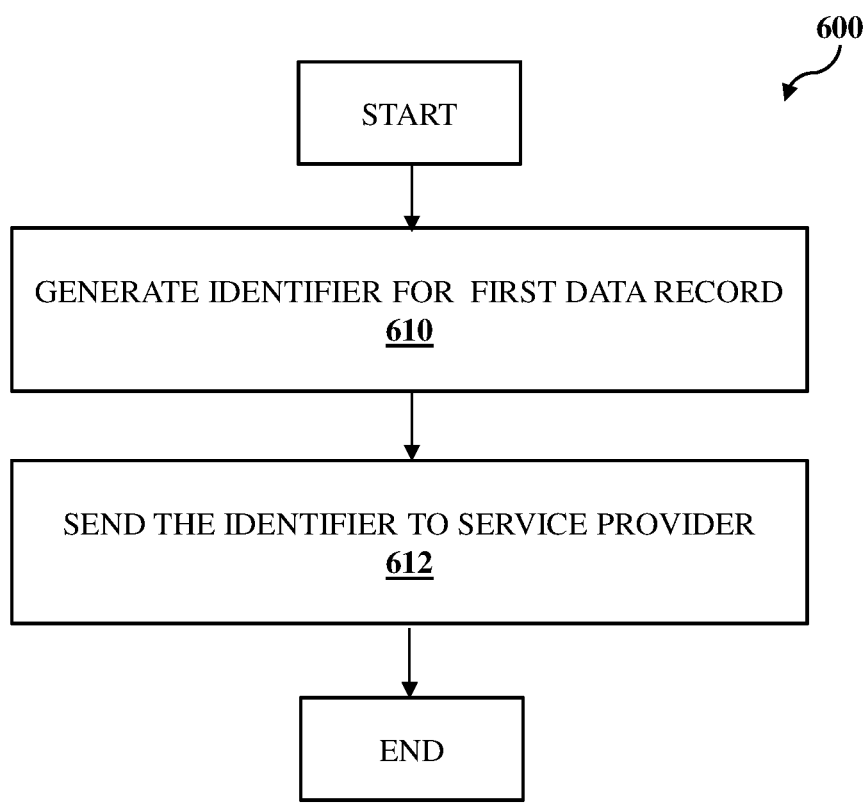
FIG. 6 depicts a flow chart of an example method for data compression according to embodiments of the present invention.

Referring now to FIG. 6, a flowchart for method 600 for data protection according to an embodiment of the present disclosure is depicted. Method 600 is implemented by computer system/server 12 of FIG. 1. Alternatively, method 600 may be implemented by proxy 420 of FIG. 4, or another device in a network environment. It should be noted that method 600 is only illustrative and is not intended to suggest any limitation as to the scope of use or functionality of embodiments of the present disclosure.

At block 610, a device (such as, computer system/server 12 of FIG. 1, proxy 420 of FIG. 4, or another device) may generate an identifier for a first data record relating to a user device based on a first machine learning model.

Then, at block 612, the device sends the identifier to a service provider. The service provider then uses the identifier to determine one or more contents to be sent to the user device.

In some embodiments, to generate the identifier for the first data record, the device applies the first data record as an input to the first machine learning model, obtains a value outputted by the first machine learning model corresponding to the first data record, and generates the identifier based on the value.

In some embodiments, to create the first machine learning model, the device obtains training records, assigns values respectively to the training records, and creates the first machine learning model based on the training records using one or more classification and regression tree algorithms. Each leaf node of the first machine learning model corresponds to one of the assigned values. The first machine learning model is capable of mapping an input to a leaf node of the first machine learning model and outputting a value corresponding to the leaf node.

In some embodiments, the training records may include data records collected previously from one or more user devices and/or records generated based on the collected data records.

In some embodiments, the first data record relating to the user device may include an original data record received from the user device. The original data record may include user data to be protected.

In some embodiments, the first data record relating to the user device may include a transformed record corresponding to an original data record received from the user device. The original data record may include user data to be protected. To obtain the transformed record, the device: (i) clusters the original data record to a first cluster using the machine logic of the cluster model; and (ii) obtains a record of a center point of the first cluster as the transformed record.

In some embodiments, to create the second machine learning model, the device obtains training records, sets the number of clusters to be applied to the training records, and creates the second machine learning model based on the training records using one or more clustering algorithms. The second machine learning model may be capable to cluster an input to a cluster. In some embodiments, a k-means algorithm is used to perform the clustering, at least in part.

In some embodiments, the service provider maintains mapping relationship between identifiers and contents, and the service provider determines the one or more contents based on the identifier using the mapping relationship.

In some embodiments, the device updates the first machine learning model and/or the second machine learning model using subsequent records after obtaining the training records.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   generating, by one or more processing units, an identifier for a first data record relating to a user device, wherein the identifier is generated based on a value output by a first machine learning model receiving the first data record as input; and
   sending, by one or more processing units, the identifier to a service provider, wherein the identifier is used by the service provider to determine one or more contents to be sent to the user device.

2. The computer-implemented method of claim 1, wherein generating the identifier for the first data record further comprises:
   applying, by one or more processing units, the first data record as an input to the first machine learning model;
   obtaining, by one or more processing units, the value outputted by the first machine learning model corresponding to the first data record; and
   generating, by one or more processing units, the identifier based on the value.

3. The computer-implemented method of claim 2, wherein the first machine learning model is created by:
   obtaining, by one or more processing units, training records;
   assigning, by one or more processing units, values respectively to the training records; and
   creating, by one or more processing units, the first machine learning model based on the training records using one or more classification and regression tree algorithms, wherein each leaf node of the first machine learning model corresponds to one of the assigned values, and the first machine learning model is capable to map an input to a leaf node of the first machine learning model and output a value of the leaf node.

4. The computer-implemented method of claim 3, wherein the training records include data records collected previously from one or more user devices and/or records generated based on the collected data records.

5. The computer-implemented method of claim 1, wherein the first data record includes an original data record received from the user device comprising user data to be protected.

6. The computer-implemented method of claim 1, wherein the first data record includes a transformed record corresponding to an original data record received from the user device comprising user data to be protected, and the transformed record is obtained by:
   clustering, by one or more processing units, the original data record to a first cluster based on a second machine learning model; and
   obtaining, by one or more processing units, a record of a center point of the first cluster as the transformed record.

7. The computer-implemented method of claim 6, wherein the second machine learning model is created by:
   obtaining, by one or more processing units, training records;
   setting, by one or more processing units, a number of clusters to be applied to the training records; and
   creating, by one or more processing units, the second machine learning model based on the training records using one or more clustering algorithms, wherein the second machine learning model is capable to cluster an input to a cluster.

8. The computer-implemented method of claim 7, wherein the one or more clustering algorithms comprise k-means algorithms.

9. The computer-implemented method of claim 1, wherein the service provider maintains mapping relationship between identifiers and contents, and the one or more contents are determined by the service provider based on the identifier using the mapping relationship.

10. The computer-implemented method of claim 7, wherein the first machine learning model or the second machine learning model is further updated using subsequent records after obtaining of the training records.

11. A computer program product (CPP) comprising:
    a computer-readable memory coupled to one or more processors; and
    computer readable instructions stored in the computer-readable memory that, when executed by the one or more processors, performs operations comprising:
        generating an identifier for a first data record relating to a user device, wherein the identifier is generated based on a value output by a first machine learning model receiving the first data record as input; and
        sending the identifier to a service provider, wherein the identifier is used by the service provider to determine one or more contents to be sent to the user device.

12. The computer program product of claim 11, wherein generating the identifier for the first data record further comprises:
    applying the first data record as an input to the first machine learning model;
    obtaining a value outputted by the first machine learning model corresponding to the first data record; and
    generating the identifier based on the value.

13. The computer program product of claim 12, wherein the first machine learning model is created by:
    obtaining training records;
    assigning values respectively to the training records; and
    creating the first machine learning model based on the training records using one or more classification and regression tree algorithms, wherein each leaf node of the first machine learning model corresponds to one of the assigned values, and the first machine learning model is capable to map an input to a leaf node of the first machine learning model and output a value of the leaf node.

14. The computer program product of claim 13, wherein the training records include data records collected previously from one or more user devices and/or records generated based on the collected data records.

15. The computer program product of claim 11, wherein the first data record includes an original data record received from the user device comprising user data to be protected.

16. The computer program product of claim 11, wherein the first data record includes a transformed record corresponding to an original data record received from the user device comprising user data to be protected, and the transformed record is obtained by:
    clustering the original data record to a first cluster based on a second machine learning model; and
    obtaining a record of a center point of the first cluster as the transformed record.

17. The computer program product of claim 16, wherein the second machine learning model is created by:
    obtaining training records;
    setting a number of clusters to be applied to the training records; and
    creating the second machine learning model based on the training records using one or more clustering algorithms, wherein the second machine learning model is capable to cluster an input to a cluster.

18. The computer program product of claim 11, wherein the computer program product is in a computer system and the computer system includes the one or more processors.

19. A computer implemented method (CIM) comprising:
    applying a set of classification and regression tree algorithms to a plurality of training records to obtain a decision tree machine learning (ML) model including a plurality of leaf nodes, with the plurality of leaf nodes respectively corresponding to the plurality of training records, and with a given first leaf node of the plurality of leaf nodes including a first assigned value that is assigned to a training record corresponding to the first leaf node; and
    applying a set of clustering algorithms to the plurality of training records to obtain a cluster ML model including a plurality of clusters and a plurality of center points; and
    transforming a new data record to obtain a transformed record.

20. The CIM of claim 19 wherein the transformation of the new data record includes:
    clustering the new data record to a first cluster of the plurality of clusters; and
    obtaining a record of a center point of the first cluster as the transformed record.

* * * * *